UNITED STATES PATENT OFFICE.

HUGO PRINZ, OF FRANKFORT-ON-THE-MAIN, GERMANY, ASSIGNOR TO FARBFABRIK, VORMALS BRÖNNER, OF SAME PLACE.

MANUFACTURE OF BETA-NAPHTHYLAMINE SULPHO-ACID.

SPECIFICATION forming part of Letters Patent No. 332,829, dated December 22 1885.

Application filed May 5, 1884. Serial No. 130,431. (Specimens.) Patented in Germany July 5, 1882, No. 22,547; in Belgium July 17, 1882, No. 58,501; in England August 4, 1882, No. 3,724; in France August 5, 1882, No. 150,503, and in Luxemburg March 19, 1883, No. 268.

*To all whom it may concern:*

Be it known that I, HUGO PRINZ, a subject of the Emperor of Germany, and residing at Frankfort-on-the-Main, Germany, have invented new and useful Improvements in the Manufacture of Sulpho-Acids, of which the following is a specification.

The method forming the object of my invention is founded upon the fact discovered by me, and hitherto not known, that beta-naphthol sulpho-acids can be turned into their respective beta-naphthylamine sulpho-acids by treating with ammonia, by which a reactional exchange of the hydroxyl group with the amido group takes place. For example:

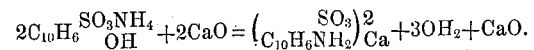

and this reaction allows the most profitable production of beta-naphthylamine sulpho-acids which are most important for the manufacture of azo coloring-matters. For this transformation, I employ the well-known and nowhere-patented beta-naphthol monosulpho-acid as made and described by Schäfer, (see Annalen der Chemie und Pharmacie, No. 152, page 296,) its salts being treated at a high temperature with ammonia. It is all the same if the combinations are formed in a free condition or whether they result during the reaction, or with or without water, carried on for a longer or shorter period, under pressure or not.

For the production of beta-naphthol monosulpho-acid, I adopt, in general, the method given by Schäfer—that is to say, one part beta-naphthol is heated with two parts sulphuric acid of 66° Baumé at a temperature of from 90° to 100° Celsius until the naphthol is fully dissolved, and obtain the acid by the known method either as calcium or natron salts.

The method of producing beta-naphthylamine sulpho-acid is as follows: Sixty kilograms of neutral or acid beta-naphthol monosulpho-acid of ammonia, sixty kilograms water, and sixty kilograms hydrate of lime are heated under pressure in an autoclave about twenty-four hours at a temperature of 180° to 200° Celsius. The product of reaction is dissolved in five hundred liters of hot water, filtered, and treated with acid. The beta-naphthylamine monosulpho-acid is thrown off in crystalline masses, and can be cleaned by pressing or dissolving and reprecipitating.

The following is the formula for the above-described reaction:

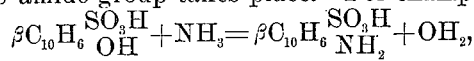

In place of the ammonia salt of the beta-naphthol monosulpho-acid, all its other salts can be used. Thus good results can be obtained with sodium salts, with carbonate of ammonia, or with a mixture of hydrate of lime and hydrochlorate of ammonia.

I do not confine myself to the exact weights named above, as these can be somewhat varied without affecting the last result.

By the above-named operation I obtain a new beta-naphthylamine sulpho-acid which differs essentially from the beta-naphthylamine sulpho-acids known up to the present time. From its diazo compounds, in combination with amine phenols, naphthols, their ethers, and sulpho-acids valuable azo coloring-matters are obtained.

The naphthylamine sulpho-acid obtained by my process is distinguished by the difficulty of dissolving it, (one part dissolving in about two hundred and sixty parts of boiling water.) On the other hand, the almost insoluble beta-naphthylamine monosulpho-acid produced by sulphating beta-naphthylamine is more easily dissolved, (one part can be dissolved in about seventy parts of boiling water.)

Further, the before-described beta-naphthylamine sulpho-acid forms almost insoluble salts of highly crystallizing properties, while on the other hand the acid produced from beta-naphthylamine gives salts easily soluble but crystallizing with difficulty. Thus, for example, one part of baryta salt of my sulpho-acid can be dissolved in about one hundred and eighty parts water at 15° Celsius. On the other hand, one part of baryta salt of sulpho-acid produced from beta-naphthylamine is dissolved in about 9.5 parts water at 15° Celsius.

Having thus described my invention and the manner of operating the same, I claim—

1. The method of obtaining beta-naphthylamine sulpho-acid, consisting in treating the beta-naphthol monosulpho-acid described by Schäfer with ammonia at a temperature of about from 180° to 200° Celsius, substantially as herein described.

2. The new beta-naphthylamine sulpho-acid having the properties herein set forth—that is to say, being difficultly soluble in water and forming almost insoluble salts of highly crystallizing properties.

In testimony whereof I have signed my name to this specification in the presence of two subscribing witnesses.

HUGO PRINZ.

Witnesses:
FRANZ WIRTH,
FRANZ HASSLACHER.